US009784632B2

(12) United States Patent
Hirayama (10) Patent No.: US 9,784,632 B2
(45) Date of Patent: Oct. 10, 2017

(54) SENSOR SIGNAL DETECTION DEVICE (71) Applicant: DENSO CORPORATION, Kariya, Aichi-pref. (JP)

(72) Inventor: Toru Hirayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 50 days.

(21) Appl. No.: 14/914,690

(22) PCT Filed: Aug. 22, 2014

(86) PCT No.: PCT/JP2014/004317
§ 371 (c)(1),
(2) Date: Feb. 26, 2016

(87) PCT Pub. No.: WO2015/045267
PCT Pub. Date: Apr. 2, 2015

(65) Prior Publication Data
US 2016/0209287 A1    Jul. 21, 2016

(30) Foreign Application Priority Data

Sep. 30, 2013  (JP) ................................ 2013-204038
May 28, 2014   (JP) ................................ 2014-110192

(51) Int. Cl.
*G01L 19/04*     (2006.01)
*G01L 9/06*      (2006.01)

(52) U.S. Cl.
CPC .............. *G01L 19/04* (2013.01); *G01L 9/065* (2013.01)

(58) Field of Classification Search
CPC ... G01L 19/04; G01L 9/00; G01L 9/06; G01L 9/065
See application file for complete search history.

(56) References Cited

U.S. PATENT DOCUMENTS 4,872,349 A * 10/1989 Espiritu-Santo ........ G01L 9/065
                                                73/708
4,986,131 A    1/1991 Sugiyama et al.
(Continued)

FOREIGN PATENT DOCUMENTS

DE        10314789 A1    10/2004
JP      1989-170814 A     7/1989
(Continued)

OTHER PUBLICATIONS

International Search Report of the International Searching Authority dated Nov. 18, 2014 issued in the corresponding International application No. PCT/JP2014/004317 (and English translation).
(Continued)

*Primary Examiner* — Nguyen Ha
(74) *Attorney, Agent, or Firm* — Posz Law Group, PLC (57) ABSTRACT

Sensor signal detection device includes: a sensor element; a temperature detection element connected in series with the sensor element; a constant voltage power supply applying constant voltage to a series circuit of the temperature detection element and the sensor element; a short-circuit switch short-circuiting both terminals of the temperature detection element; and a controller controlling a changeover between a sensor detection state and a temperature detection state. In the sensor detection state, a sensor signal from the sensor element is obtained by turning on the short-circuit switch to apply the constant voltage across both terminals of the sensor element from the constant voltage power supply. In the temperature detection state, a temperature detection signal of the temperature detection element is obtained by turning off the short-circuit switch to connect the temperature detection element to the sensor element in series and applying constant voltage from the constant voltage power supply.

11 Claims, 8 Drawing Sheets

(56) References Cited

U.S. PATENT DOCUMENTS

| | | | |
|---|---|---|---|
| 5,121,118 A | 6/1992 | Hermann | |
| 5,228,337 A * | 7/1993 | Sharpe | B60C 23/0408 73/708 |
| 5,343,755 A | 9/1994 | Huss | |
| 5,781,142 A | 7/1998 | Onodera et al. | |
| 6,329,825 B1 | 12/2001 | Tanaka et al. | |
| 6,401,541 B1 * | 6/2002 | Kurtz | G01L 15/00 73/716 |
| 6,433,554 B1 | 8/2002 | Kawate et al. | |
| 2002/0073783 A1 * | 6/2002 | Wilner | A61B 3/16 73/716 |
| 2002/0103613 A1 | 8/2002 | Maher et al. | |
| 2003/0184327 A1 | 10/2003 | Makino | |
| 2003/0221491 A1 | 12/2003 | Albert et al. | |
| 2005/0011271 A1 | 1/2005 | Albert et al. | |
| 2006/0107746 A1 | 5/2006 | Albert et al. | |
| 2006/0119498 A1 | 6/2006 | Aoyama et al. | |
| 2006/0219018 A1 | 10/2006 | Albert et al. | |
| 2009/0195423 A1 | 8/2009 | Li | |
| 2009/0278718 A1 | 11/2009 | Dupuis | |
| 2009/0315745 A1 | 12/2009 | McLoughlin | |
| 2010/0085227 A1 | 4/2010 | Chang et al. | |
| 2012/0133800 A1 | 5/2012 | Jung et al. | |

FOREIGN PATENT DOCUMENTS

| | | |
|---|---|---|
| JP | 1991-134532 A | 6/1991 |
| JP | 1995-209102 A | 8/1995 |
| JP | 3041829 B2 | 3/2000 |
| JP | 2000-146732 A | 5/2000 |
| JP | 2001-147167 A | 5/2001 |
| JP | 3707281 B2 | 8/2005 |
| JP | 3765915 B2 | 2/2006 |
| JP | 2006-084201 A | 3/2006 |
| JP | 3964037 B2 | 6/2007 |
| JP | 4178663 B2 | 9/2008 |
| JP | 2008-267965 A | 11/2008 |
| JP | 2010-104142 A | 5/2010 |
| JP | 2013-157710 A | 8/2013 |
| JP | 2014-064092 A | 4/2014 |
| JP | 2014-116735 A | 6/2014 |

OTHER PUBLICATIONS

Written Opinion of the International Searching Authority dated Nov. 18, 2014 issued in the corresponding International application No. PCT/JP2014/004317 (and English translation).

\* cited by examiner

PRESSURE SIGNAL AND TEMPERATURE SIGNAL ALTERNATIVELY PROCESSED BY A/D CONVERSION
TEMPERATURE DATA OBTAINED EACH TIME

FIG. 4B

PRESSURE SIGNAL AND TEMPERATURE SIGNAL PROCESSED BY A/D CONVERSION
TEMPERATURE DATA OBTAINED ONCE AT EVERY PLURALITY OF TIMES

FIG. 4C

TEMPERATURE SIGNAL PROCESSED BY A/D CONVERSION ONCE AT EVERY PLURALITY OF TIMES
TEMPERATURE DATA OBTAINED EACH TIME

FIG. 4D

TEMPERATURE SIGNAL PROCESSED BY A/D CONVERSION ONCE AT EVERY PLURALITY OF TIMES
TEMPERATURE DATA OBTAINED ONCE AT EVERY PLURALITY OF TIMES

SENSOR SIGNAL DETECTION DEVICE

CROSS REFERENCE TO RELATED APPLICATIONS

This application is the U.S. national phase of International Patent Application No. PCT/JP2014/004317 filed on Aug. 22, 2014 and is based on Japanese Patent Application No. 2013-204038 filed on Sep. 30, 2013 and Japanese Patent Application No. 2014-110192 filed on May 28, 2014, the disclosures of which are incorporated herein by reference.

TECHNICAL FIELD

The present disclosure relates to a sensor signal detection device.

BACKGROUND ART

A pressure sensor, as a sensor element, having a configuration in which, for example, resistors are bridge-connected measures a change in a resistance value of the resistors caused by distortion according to pressure by a voltage appearing between output terminals to thereby detect the pressure. In this case, an output of the sensor element fluctuates according to temperature of measurement environment. Consequently, in the case of using the sensor element in an environment in which temperature fluctuation is large or in the case where accurate detecting operation is necessary, correction of a detection signal according to temperature has to be performed.

In this case, conventionally, a sensor element performing detection by constant current driving for the purpose of eliminating the influence of temperature is used. It uses a technique of self-sensitivity compensation in which sensitivity temperature characteristic of an output of the sensor element is cancelled under constant current driving condition.

An application voltage Vg to a sensor element determining sensor element sensitivity is determined by a product of constant current Is passed to the sensor element and sensor element resistance Rg (Vg=Is×Rg). However, the application voltage Vg to the sensor element is regulated by saturation voltage Vsatp and threshold voltage Vtp of an output stage Pch transistor necessary for normal operation of a constant current circuit. A voltage decreased from power supply voltage Vcc only by Vsatp+Vtp is obtained at the maximum, and maximization of sensor element sensitivity is limited. The problem is influenced more as the voltage driving of a semiconductor element is becoming lower.

PRIOR ART LITERATURES

Patent Literature

Patent Literature 1: JP-2006-84201-A
Patent Literature 2: JP-2003-294559-A

SUMMARY OF INVENTION

The present disclosure provides a sensor signal detection device capable of making a correction for a temperature fluctuation with high precision while employing a constant voltage driving method by which application voltage to a sensor element can be maximally set.

A sensor signal detection device according to an embodiment of the present disclosure includes: a sensor element; a temperature detection element connected to the sensor element in series; a constant voltage power supply applying constant voltage to a series circuit of the sensor element and the temperature detection element; a short-circuit switch that short-circuits both terminals of the temperature detection element; and a control device controls a changeover, in a time division manner, between a sensor detection state in which a sensor signal of the sensor element is obtained in a state where the short-circuit switch is turned on so as to apply a constant voltage across both terminals of the sensor element from the constant voltage power supply and a temperature detection state in which a temperature detection signal of the temperature detection element is obtained in a state where the short-circuit switch is turned off, the temperature detection element is connected to the sensor element in series, and a constant voltage is applied from the constant voltage power supply.

With the configuration, the sensor detection state and the temperature signal detection state are controlled in a time division manner by the control device. In the sensor detection state, a sensor signal is obtained in a state where voltage of the constant voltage power supply is applied to the sensor element. In the temperature detection state, a temperature detection signal of the temperature detection element is obtained in a state where the temperature detection element is connected to the sensor element in series. Consequently, the sensor signal can be obtained in a state where the constant voltage power supply is applied as it is to the sensor element, and maximum detection sensitivity can be held. Although the sensor signal includes a factor that a characteristic of the sensor element fluctuates according to temperature, the fluctuation element can be corrected by detecting a temperature detection signal at close time point, so that information obtained by correcting the temperature fluctuation of the sensor signal can be obtained. Therefore, without employing the configuration of supplying constant current to the sensor element, as a configuration capable of fully applying the voltage of the constant voltage power supply, correction on temperature can be accurately performed in a manner similar to the case of supplying constant current.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Hereinafter, a first embodiment of the present disclosure will be described with respect to the case of applying the disclosure to a detection device of a pressure sensor as a sensor signal detection device with reference to FIGS. 1, 2, 3A, 3B, and 4A to 4D.

Figure 1:
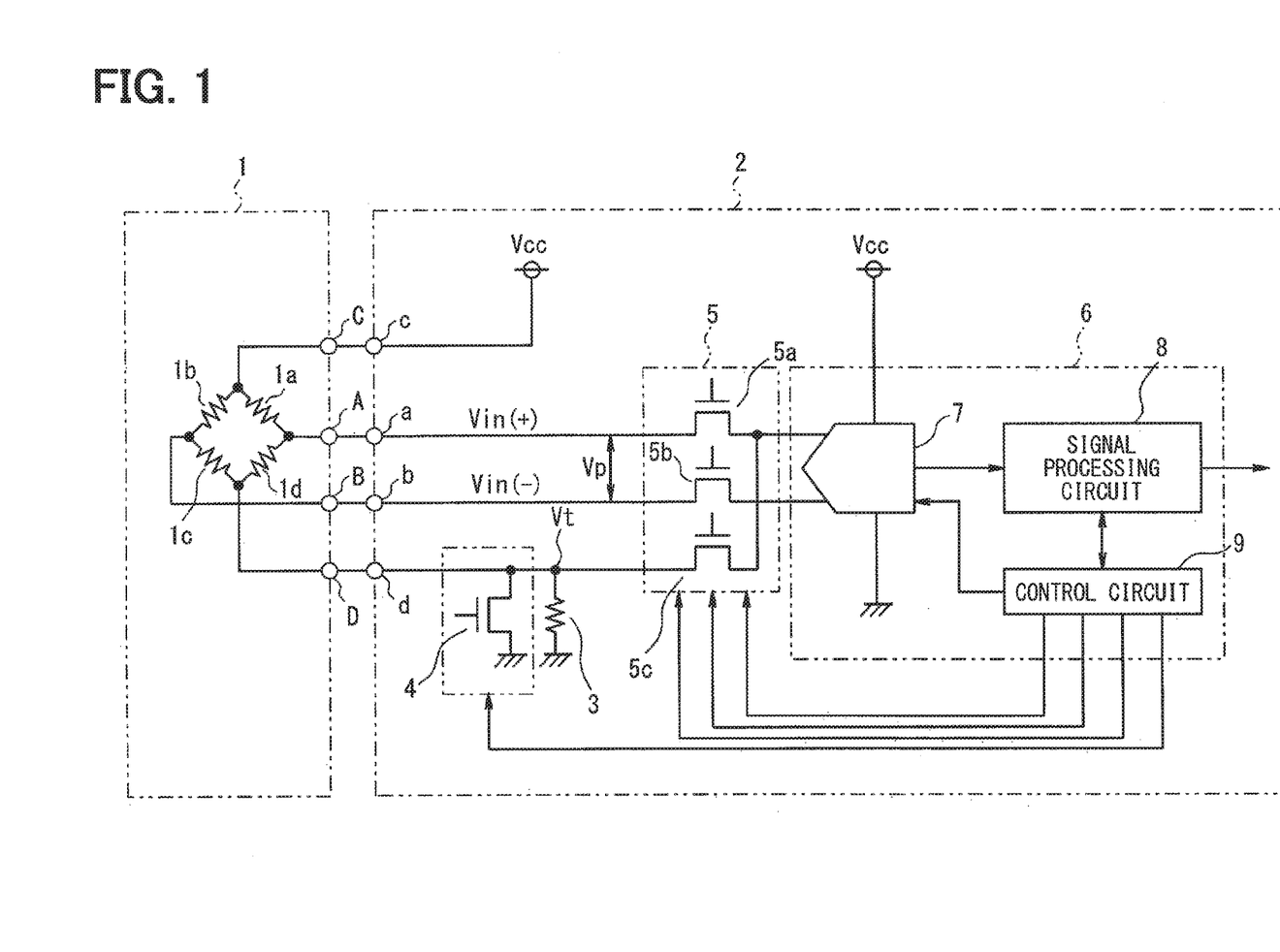
FIG. 1 is an electric configuration diagram illustrating a first embodiment of the present disclosure.

In FIG. 1 illustrating a schematic entire configuration, a pressure sensor element 1 as a sensor element is a pressure sensor of a self-sensitivity compensation type in which four piezoresistive elements 1a to 1d are bridge-connected. In the pressure sensor element 1, a semiconductor chip is provided with a diaphragm for pressure detection, and the piezoresistive elements 1a to 1d are disposed in the diaphragm. When the diaphragm receives pressure and displaces in the sensor element 1, the resistance value of the piezoresistive elements 1a to 1d changes according to the displacement. The pressure sensor element 1 outputs, as a sensor signal, a potential signal according to the change in the resistance value corresponding to the displacement from each of output terminals A and B.

The pressure sensor element 1 has four terminals A to D and, when a power supply voltage Vcc is applied across the input terminals C and D from the outside, outputs a sensor signal appearing between the output terminals A and B. Since a resistance value Rg of the piezoresistive elements 1a to 1d fluctuates according to a change in temperature T, it can be expressed as Rg(T) as a function of the temperature T.

A detection circuit 2 has terminals a, b, c, and d connected to the four terminals; the output terminals A and B, and the input terminals C and D of the pressure sensor element 1, respectively. The detection circuit 2 is configured by, for example, a one-chip semiconductor element, has internally a power supply circuit and, supplies the power supply voltage Vcc to each of the components. To the terminal c, the power supply voltage Vcc is supplied from the power supply circuit. The terminal d is connected to a ground terminal via a resistor 3 for temperature detection as a temperature detection element. The terminal d is also connected to the ground terminal via a drain and a source of an FET (Field Effect Transistor) 4 as a short-circuit switch or a semiconductor switching element.

The temperature detection resistor 3 has a resistance value Rc having a characteristic that an extremely small change occurs for a temperature change. The ratio of a change in the resistance value Rc of the temperature detection resistor 3 is extremely small with respect to a temperature change, and a value which is, for example, about 1/100 of a resistance value Rg(T) of the piezoresistive elements 1a to 1d of the pressure sensor element 1 is used. The FET 1 has a function of switching the temperature detection resistor 3 to a short-circuit state. A terminal voltage appearing in a state where the FET 4 is off, that is, a state where the temperature detection resistor 3 is connected in series to the pressure sensor element 1 is a temperature detection signal Vt.

Sensor signals output from the output terminals A and B of the pressure sensor element 1 are supplied as potential signals Vin(+) and Vin(−) to the terminals "a" and "b", respectively, and the potential difference of the signals becomes a pressure detection signal Vp (=Vin(+)−Vin(−)).

A time-division changing switch 5 has three FETs 5a to 5c as semiconductor switching elements. A control unit 6 has a cyclic A/D conversion circuit 7, a signal processing circuit 8, and a control circuit 9. The control unit 6 functions as a control device. In the time-division changing switch 5, the FET 5a is connected between the terminal "a" and one of input terminals of the cyclic A/D conversion circuit 7. The FET 5b is connected between the terminal "b" and the other input terminal of the cyclic A/D conversion circuit 7. The FET 5c is connected between the terminal "d" and one of input terminals of the cyclic A/D conversion circuit 7.

The FET 4 and the three FETs 5a to 5c of the time-division changing switch 5 are turned on/off by the control circuit 9, and a detection operation switching control is performed. As will be described later, at the time of pressure signal detection, the control circuit 9 controls to a state where the FET 5a is on, the FET 5b is on, the FET 5c is off, and the FET 4 is on. At the time of temperature signal detection, the control circuit 9 controls to a state where the FET 5a is off, the FET 5b is off, the FET 5c is on, and the FET 4 is off. In this case, as the value of on resistance of the FETs 4 and 5a to 5c, a resistance value (for example, a few Ω) which is sufficiently smaller than the resistance Rg (for example, a few kΩ) of the pressure sensor element 1 is chosen. Therefore, the influence of a voltage drop which occurs in a state where the FETs 4 and 5a to 5c are on is small enough to be ignored.

The cyclic A/D conversion circuit 7 amplifies the voltage Vp as the difference of signal voltages input to the two input terminals and the temperature detection signal Vt as analog input signals and converts them to digital signals. The signal processing circuit 8 fetches the detection signal of the pressure digitally converted and performs a temperature compensating process to obtain the data of the pressure. The control circuit 9 performs the on/off control on the FET 4 and the three FETs 5a to 5c of the time-division changing switch 5 as described above and a control on the cyclic A/D conversion circuit 7 and the signal processing circuit 8. The control circuit 9 executes the controls in accordance with a control program stored on the inside.

Figure 2:
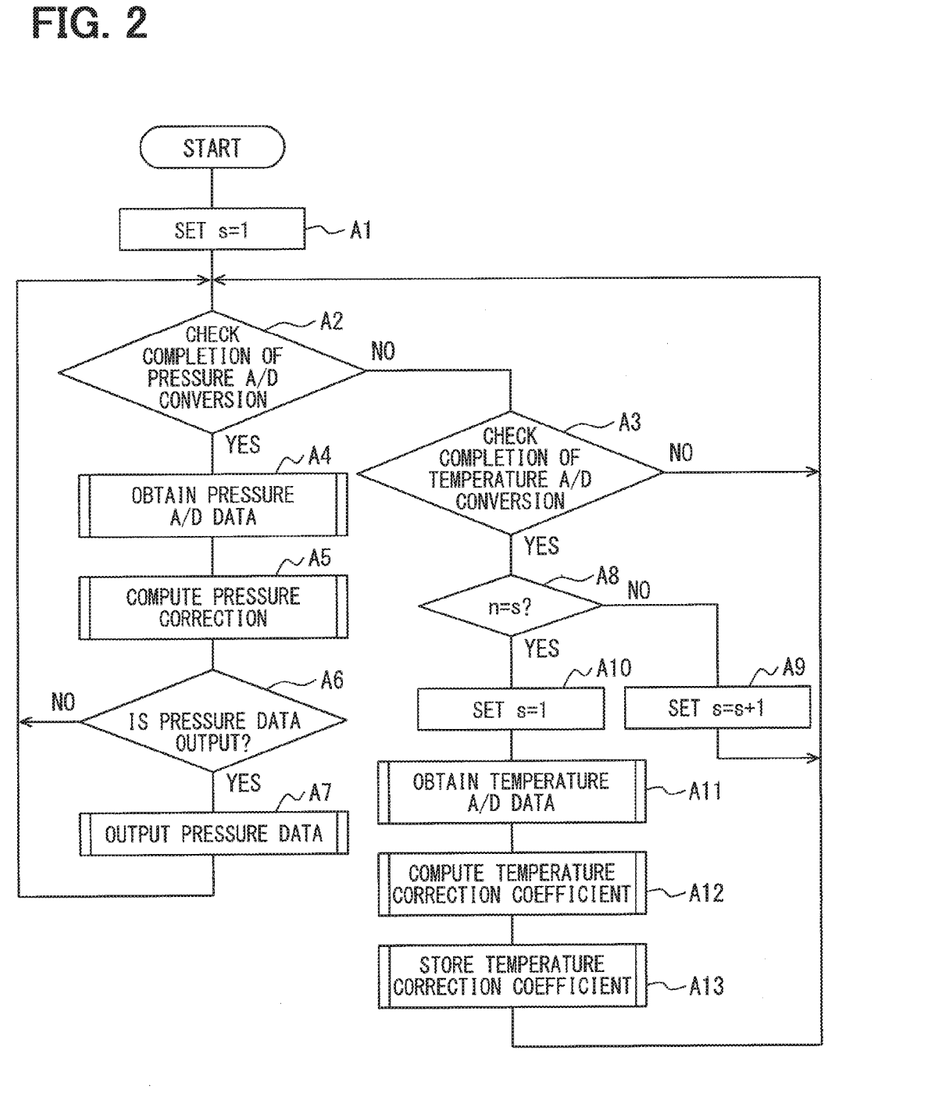
FIG. 2 is a flowchart illustrating a data obtaining process.

Next, also referring to FIGS. 2 to 4, the action of the configuration will be described. In the embodiment, the measurement of the pressure is performed by the pressure sensor element 1 in a state where, by applying the constant voltage Vcc of the constant voltage power supply Vcc across the input terminals C and D of the pressure sensor element 1, not constant current but the constant voltage Vcc is applied. Therefore, the application voltage to the pressure sensor element 1 becomes the constant voltage power supply voltage Vcc itself to the pressure sensor 1, and the output sensitivity of the pressure sensor element 1 can be maximized. The detection voltage Vt corresponding to temperature detection is detected and the temperature correcting process is performed so that measurement environment can be addressed to a temperature change. FIG. 2 illustrates the control operations by the control circuit 9.

The control circuit 9 performs the on/off control on the FETs 4 and 5a to 5c so as to alternately switch the pressure detection state and the temperature detection state at predetermined time intervals. The controls on the FETs 4 and 5a to 5c are as follows.

|  | at the time of pressure detection | at the time of temperature detection |
|---|---|---|
| FET 4 | on | off |
| FET 5a | on | off |
| FET 5b | on | off |
| FET 5c | off | on |

Accordingly, input of the pressure detection signal Vp and the temperature detection signal Vt to the cyclic A/D conversion circuit 7 is switched in a time division manner. As a result, in the pressure detection state, sensor signals output from the output terminals A and B of the pressure sensor element 1 are supplied as potential signals Vin(+) and Vin(−), respectively, to the cyclic A/D conversion circuit 7 via the FETs 5a and 5b. In the cyclic A/D conversion circuit 7, while amplifying the voltage of the difference between the input potential signals Vin(+) and Vin(−), the voltage is converted to digital data and the resultant is output as the pressure detection signal Vp.

In the temperature detection state, in a state where the temperature detection resistor 3 is connected in series to the pressure sensor element 1, the constant voltage Vcc is applied. Consequently, the terminal voltage Vt of the temperature detection resistor 3 is input to the cyclic A/D conversion circuit 7 via the FET 5c. In this state, when the constant voltage Vcc is applied to a series circuit of the pressure sensor element 1 and the temperature detection resistor 3, a current $I_2$ flows. Since the resistance value Rg(T) of the pressure sensor element 1 fluctuates according to the pressure and the temperature T, the current $I_2$ at this time has a current value including the change amount. Since the temperature detection resistor 3 has a change much smaller than the change in the resistance value Rg(T) of the pressure sensor element 1 with respect to the temperature change as described above, it can be substantially ignored. As a result, the change in the resistance value Rg(T) of the pressure sensor element 1 is reflected in the current $I_2$ and the voltage corresponding to the current value $I_2$ can be detected as the temperature detection voltage Vt.

In a state where the pressure detection state and the temperature detection state as described above are under time-division-control by switching on/off of the FETs 4 and 5a to 5c, a data fetching process is performed on the basis of a program depicted in FIG. 2 by the control circuit 9.

When the detecting operation starts, first, the control circuit 9 sets "1" as a variable "s" as an initial setting (A1). Subsequently, the control circuit 9 determines whether digital conversion of the pressure detection signal Vp by the cyclic A/D conversion circuit 7 is finished or not (A2) and determines whether digital conversion of the temperature detection signal Vt is finished or not (A3). When the digital signal converting process by the cyclic A/D conversion circuit 7 is performed on the pressure detection signal (Yes in A2), the control circuit 9 obtains digital data of the pressure detection signal Vp from the cyclic A/D conversion circuit 7 (A4) and performs a pressure correction computing process which will be described later (A5). Subsequently, the control circuit 9 determines whether a result of the pressure correction computation is output or not (A6) and, in the case of outputting the result, makes the signal processing circuit 8 output the result to the outside (A7).

When the digital signal converting process by the cyclic A/D conversion circuit 7 is performed on the temperature detection signal (Yes in A3), the control circuit 9 determines whether the value of the counter value "s" has reached a set value "n" or not (A8) and, when the counter value "s" has not reached the set value "n", increments the value of the counter value "s" by one (A9), and sets in a standby state until a converting process on the next digital signal is performed (A2 and A3 are repeated and the standby state is set).

After that, when the counter value "s" becomes equal to the set value "n" when step A8 is executed (Yes in A8), the control circuit 9 resets the counter value "s" to "1" (A9). Subsequently, the control circuit 9 obtains digital data of the temperature detection signal Vt from the cyclic A/D conversion circuit 7 (A11) and performs a process of temperature correction factor computation which will be described later (A12). When the computation of the temperature correction factor is finished, the control circuit 9 stores data of the obtained temperature correction factor into a storage region on the inside (A13) and returns to step A2.

In a manner described above, the control circuit 9 executes the computing process as necessary while obtaining the digital conversion data from the cyclic A/D conversion circuit 7 and obtains a result of the pressure detection.

Next, a computer method in each of the above-described processes will be described.

First, in the flow of the process, the setting number "n" used as a reference of determination at the time of obtaining data of the temperature detection signal Vt will be described. The setting number "n" is a setting number for lessening the burden of the computing process while avoiding fetching of the temperature detection signal Vt each time and performing the computing process. For example, in the case of fetching the temperature detection signal Vt each time, n=1 is set. Since Yes is determined from the beginning in A8 and the value of "s" is held as "1", the control circuit 9 executes step A11 each time. Consequently, data obtained by digital-converting the temperature detection signal Vt is fetched each time.

In the case of fetching the signal every other time, the setting number n is set as 2 (n=2). In the state where n=1, the counter value "s" is rewritten to "2" through step A9 and, after that, Yes is determined in step A8. Consequently, the control circuit 9 fetches the digital conversion data of the temperature detection signal Vt at the second time, that is, every other time. Every what time the temperature detection signal Vt is fetched can be set by the setting number n.

Figure 3A:
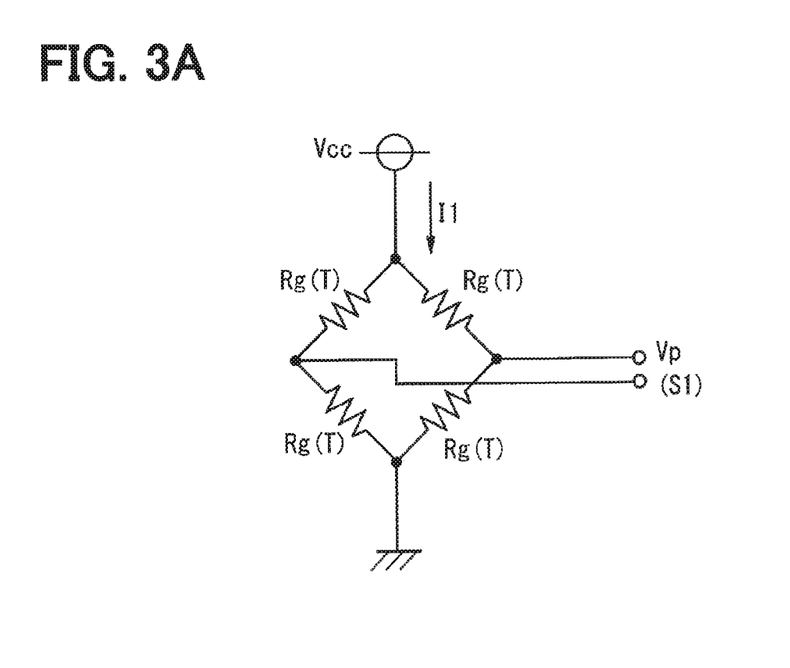
FIG. 3A is an explanatory diagram of a process of correcting detection data.
Figure 3B:
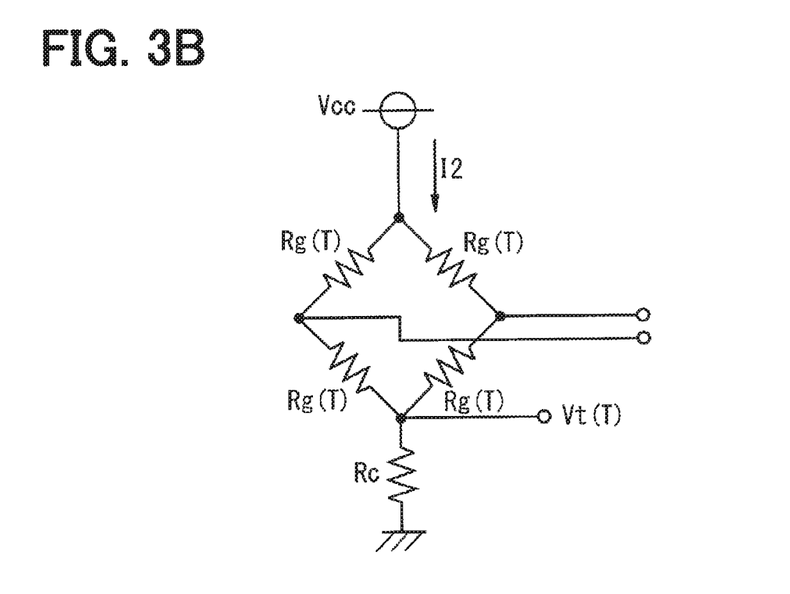
FIG. 3B is an explanatory diagram of the process of correcting detection data.

FIGS. 3A and 3B are connection diagrams for explaining a detecting operation of the pressure sensor element 1 which is bridge-connected. The diagrams illustrate a connection state in states set by the switching control operation of the FETs 4 and 5a to 5c.

FIG. 3A illustrates a connection state at the time of the pressure detecting operation, which is a state where the constant voltage Vcc of the constant voltage power supply Vcc is applied across both terminals of the pressure sensor element 1. In this state, a pressure detection signal Vp[V] generated between the output terminals A and B by the current $I_1$ flowing in the pressure sensor element 1 is taken as a pressure signal. In this case, detection sensitivity of the pressure sensor element 1 is expressed as $S_1[\mu V/kPa/A]$.

On the other hand, FIG. 3B illustrates a connection state at the time of the temperature detecting operation, which is a state where the constant voltage Vcc of the constant voltage power supply Vcc is applied across both terminals of the series circuit of the pressure sensor element 1 and the temperature detection resistor 3. In this state, a temperature detection signal Vt[V] generated at the terminal D by the current $I_2$ flowing in the pressure sensor element 1 is taken. In this case, detection sensitivity of the pressure sensor element 1 is expressed as $S_2[\mu V/kPa/A]$.

Hereinafter, the details of the process of compensating the pressure detection signal Vp by the temperature detection signal Vt on the basis of data obtained by the process of the control circuit 9 in the pressure detection state and the temperature detection state will be described.

<Definition of Values>

First, values in the following description will be defined as follows.

Vcc: constant voltage [V];

$I_1$: current [A] of the pressure sensor element when the constant voltage Vcc is applied;

Rg(T): resistance value [Ω] of piezoresistive elements 1a to 1d

α: output sensitivity proportional coefficient [μV/kPa/A] of the pressure sensor element 1;

So: sensor element output sensitivity [μV/kPa] in constant current power supply;

$S_1$: sensor element output sensitivity [μV/kPa] in constant voltage power supply;

Rc: resistance value [Ω] of temperature detection resistor 3; and

VT(T): temperature output voltage [V]

<Temperature Correcting Process>

When an output sensitivity proportionality coefficient α which becomes constant in the sensor element is used, the sensor element output sensitivity So in the constant current driving method satisfies a proportional coefficient of the following equation (1) with respect to the constant current value Io.

$$So \propto Io \times \alpha [\mu V/kPa] \qquad (1)$$

It is understood that the larger the constant current value Io is, the higher the sensor element output sensitivity So can be made. Therefore, the larger the voltage applied to the resistance value Rg(T) of the pressure sensor element 1 is, the larger the sensor output sensitivity So can be made.

In contrast, since the constant voltage driving method illustrated in FIG. 3A is employed in the embodiment, the constant voltage Vcc is applied to the pressure sensor element 1 so that the sensor element output sensitivity can be made high. However, the current $I_1$ flowing in this case does not become constant current because the resistance value Rg(T) of the piezoresistive elements 1a to 1d of the pressure sensor element 1 fluctuates with the temperature fluctuation of measurement environment. Therefore, the value of the current $I_1$ in the constant voltage driving becomes as expressed by the following equation (2).

$$I_1 = Vcc/Rg(T)[A] \qquad (2)$$

When the current $I_1$ is substituted in place of the constant current Io in the equation (1) and the relation of the equation (2) is substituted as the current $I_1$, the sensor element output sensitivity $S_1$ has a proportional relation as expressed by the following equation (3).

$$S_1 \propto I_1 \times \alpha [\mu V/kPa] = [Vcc/Rg(T)] \times \alpha [\mu V/kPa] \qquad (3)$$

Next, the resistance value Rg(T) of the piezoresistive elements 1a to 1d is obtained from the temperature signal Vt(T) detected at the time of temperature signal detection.

$$Vt(T) = Vcc \times Rc/(Rg(T) + Rc)[V] \qquad (4)$$

Therefore, Vt(T) can be calculated by the equation (4) and Rg(T) can be calculated by the following equation (5).

$$Rg(T) = [(Vcc/Vt(T)) - 1] \times Rc[\Omega] \qquad (5)$$

By substituting the relation of the equation (5) into the equation (2) of the proportional relation of the sensor element output sensitivity $S_1$, the proportional relation of the following equation (6) can be obtained.

$$S_1 \propto Vcc/[(Vcc/Vt(T)) - 1) \times Rc] \times \alpha [\mu V/kPa] \qquad (6)$$

The value appearing in the denominator in the equation (6) is set as β and replaced as the following equation (7).

$$\beta = [Vcc/Vt(T)] - 1 \qquad (7)$$

As a result, by deriving β obtained by substituting the value of Vt(T) detected at the time of the temperature detection signal into the equation (7) and substituting it into the equation (6), the relation of the following equation (8) can be obtained.

$$S_1 \propto (Vcc/(\beta \times R_c)) \times \alpha [\mu V/kPa] \qquad (8)$$

By multiplying the proportional relation of the equation (8) with β, the following equation (9) can be obtained as the sensor element output sensitivity $S_2$.

$$S_2 \propto (Vcc/R_c) \times \alpha [\mu V/kPa] \qquad (9)$$

As a result, the value obtained by multiplying the sensor element output sensitivity $S_1$ with β can be derived as the sensor element output sensitivity $S_2$ which does not depend on the temperature T. Therefore, by performing temperature correction on the basis of the sensor element output sensitivity $S_2$ on the pressure detection signal Vp, pressure information which is temperature corrected can be calculated.

<Combination of Execution of A/D Conversion and Acquisition of A/D Conversion Data>

Figure 4A:
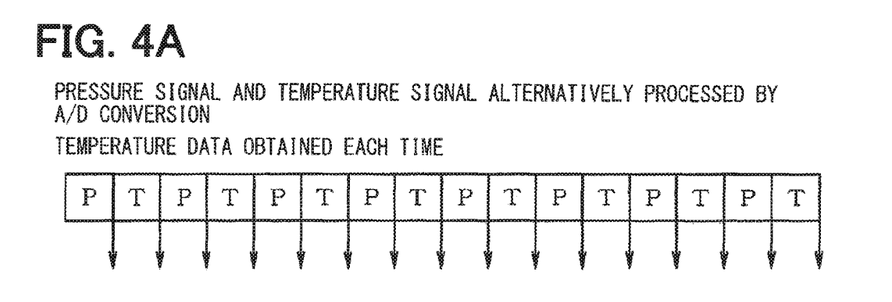
FIG. 4A is a modification of data obtaining timings.
Figure 4B:
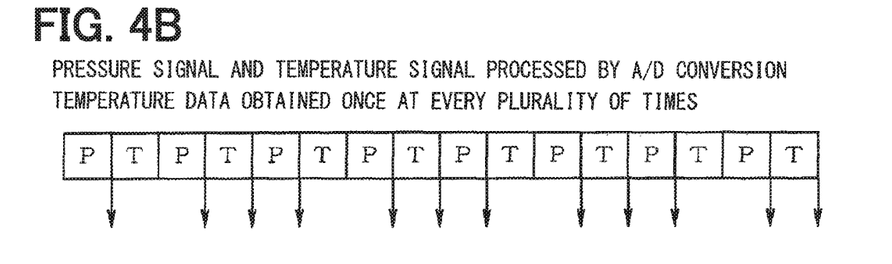
FIG. 4B is a modification of data obtaining timings.
Figure 4C:
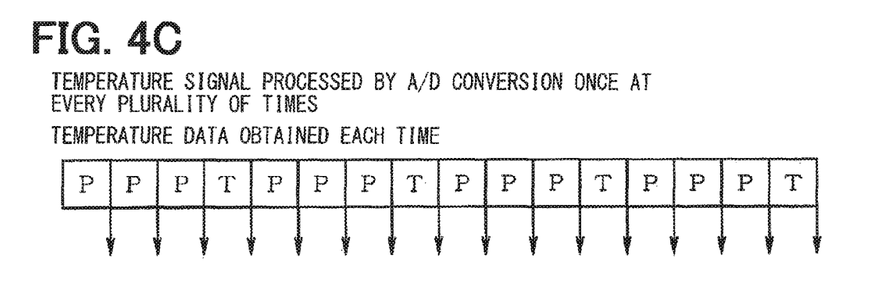
FIG. 4C is a modification of data obtaining timings.
Figure 4D:
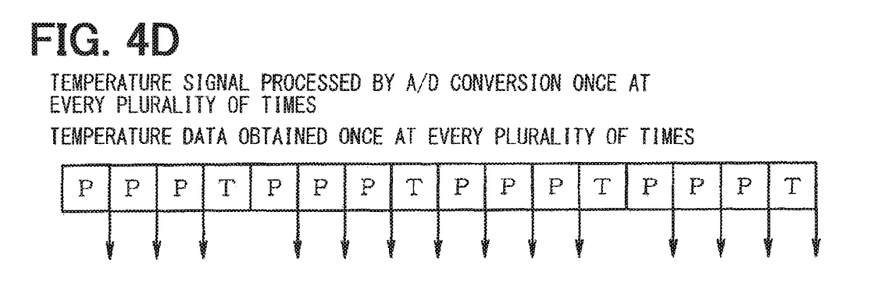
FIG. 4D is a modification of data obtaining timings.

Next, modifications of switching of signal acquisition and frequency of data acquisition will be described with reference to FIGS. 4A to 4D. In FIGS. 4A to 4D, P indicates pressure, T indicates temperature, and arrows (↓) express data acquisition. FIGS. 4A and 4B illustrate, for example, the case of alternatively switching the FET 4 and the three FETs 5a to 5c of the time division changing switch 5. In this case, the cyclic A/D conversion circuit 7 receives the pressure detection signal and the temperature detection signal alternately by its input terminals and A/D converts the signals. FIGS. 4C and 4D illustrate the case of obtaining the pressure detection state three times and, after that, executing the temperature detection state once. In this case, the cyclic A/D conversion circuit 7 repeatedly executes an operation of A/D converting the pressure detection signal by predetermined number of times, for example, three times in a row and, after that, A/D converting the temperature detection signal once.

A data fetching process can be executed as follows for such frequency of the A/D conversion. Specifically, in the method illustrated in FIGS. 4A and 4C, all of the pressure detection signals and the temperature detection signals obtained by the A/D conversion are taken. This state corresponds to the case where the setting number "n" in FIG. 2 is "1". In the method illustrated in FIGS. 4B and 4D, with respect to the pressure detection signals and temperature detection signals which are A/D converted, all of the pressure detection signals are taken, and the temperature detection signal is fetched every other time. The state corresponds to the case where the setting number "n" in FIG. 2 is "2".

The intention of changing the frequency of the A/D converting process and data fetching frequency on the pressure detection signals and the temperature detection signals as described above is. In consideration of the fact that the temperature changes relatively gently as compared with speed of occurrence of the change in the pressure, to achieve precise detection by decreasing the temperature detection state and increasing the pressure detection state by the decrease amount of the temperature detection state. The data fetching frequency of the temperature detection signal is reduced to lessen the process burden on the control circuit 9 and the data fetching circuit by decreasing the fetching in consideration that the temperature fluctuation is relatively gentle.

The setting of the frequency of switching between the pressure detection state and the temperature detection state and the setting of the frequency of data fetching as illustrated in FIGS. 4A to 4D have been described as an example, and other proper frequencies can be set. The frequency of detection can be fixedly set or can be set so as to be changed in accordance with situations. For example, in a situation that a temperature change is small, the frequency of switching to the temperature detection state can be reduced and the data fetching frequency can be reduced. By changing the setting of frequency in accordance with the temperature fluctuation, more efficient detecting operation can be performed.

According to such an embodiment, the following effects can be obtained.

The configuration of performing measurement while switching the pressure detection state and the temperature detection state in a time division manner by the time division changing switch 5 and the FET 4 as a short-circuit switch is employed. In the pressure detection state, the constant voltage Vcc is applied across the terminals of the pressure sensor element 1 and the pressure detection signal Vp is detected. In the temperature detection state, the constant voltage Vcc is applied to the series circuit of the pressure sensor element 1 and the temperature detection resistor 3, and the terminal voltage of the temperature detection resistor 3 is detected as the temperature detection signal Vt. Consequently, in the pressure detection state, the pressure detection signal Vp can be derived in a state where maximum sensitivity can be obtained by applying the constant voltage Vcc of the constant voltage power supply directly to the pressure sensor element 1. In addition, fluctuations in the resistance value Rg(T) of the pressure sensor element 1 at this time in accordance with the temperature T of detection environment can be corrected by the most recent temperature detection signal Vt.

The cyclic A/D conversion circuit 7 is provided, and the temperature correcting process on the pressure detection signal Vp is executed in the signal processing circuit 8 by using the A/D converted temperature detection signal Vt. Consequently, sensitivity temperature characteristic equivalent to that in the case of performing self-sensitivity compensation can be obtained and offset temperature characteristic can be also similarly corrected.

Since the cyclic A/D conversion circuit 7 is provided to perform A/D conversion, amplification can be simultaneously performed at the time of performing digital conversion of the pressure detection signal Vp and the temperature detection signal Vt.

Since the pressure detection state and the temperature detection state are alternately switched by the FET 4 and the FETs 5a to 5c of the time division changing switch 5, the temperature correcting process can be performed on the pressure detection signal Vp detected in the pressure detection state with the temperature detection signal Vt measured at the most recent temperature of the pressure sensor element 1.

By reducing acquisition of the temperature detection signal Vt when the temperature change is small by switching the pressure detection state and the temperature detection state every plurality of times by the FET 4 and the FETs 5a to 5c of the time division changing switch 5, more pressure detection signals Vp can be obtained.

By obtaining the temperature detection signal Vt obtained in the temperature detection state each time by the control circuit 9, finer temperature correction can be performed. By obtaining the temperature detection signal Vt every plurality of times, the process burden can be lessened when the temperature fluctuation is small.

Although the temperature detection signal Vt is used for temperature correction in the foregoing embodiment, it can be used for other purposes. For example, the temperature detection signal Vt can be used as a temperature signal output of the sensor element 1.

Second Embodiment

Figure 5:
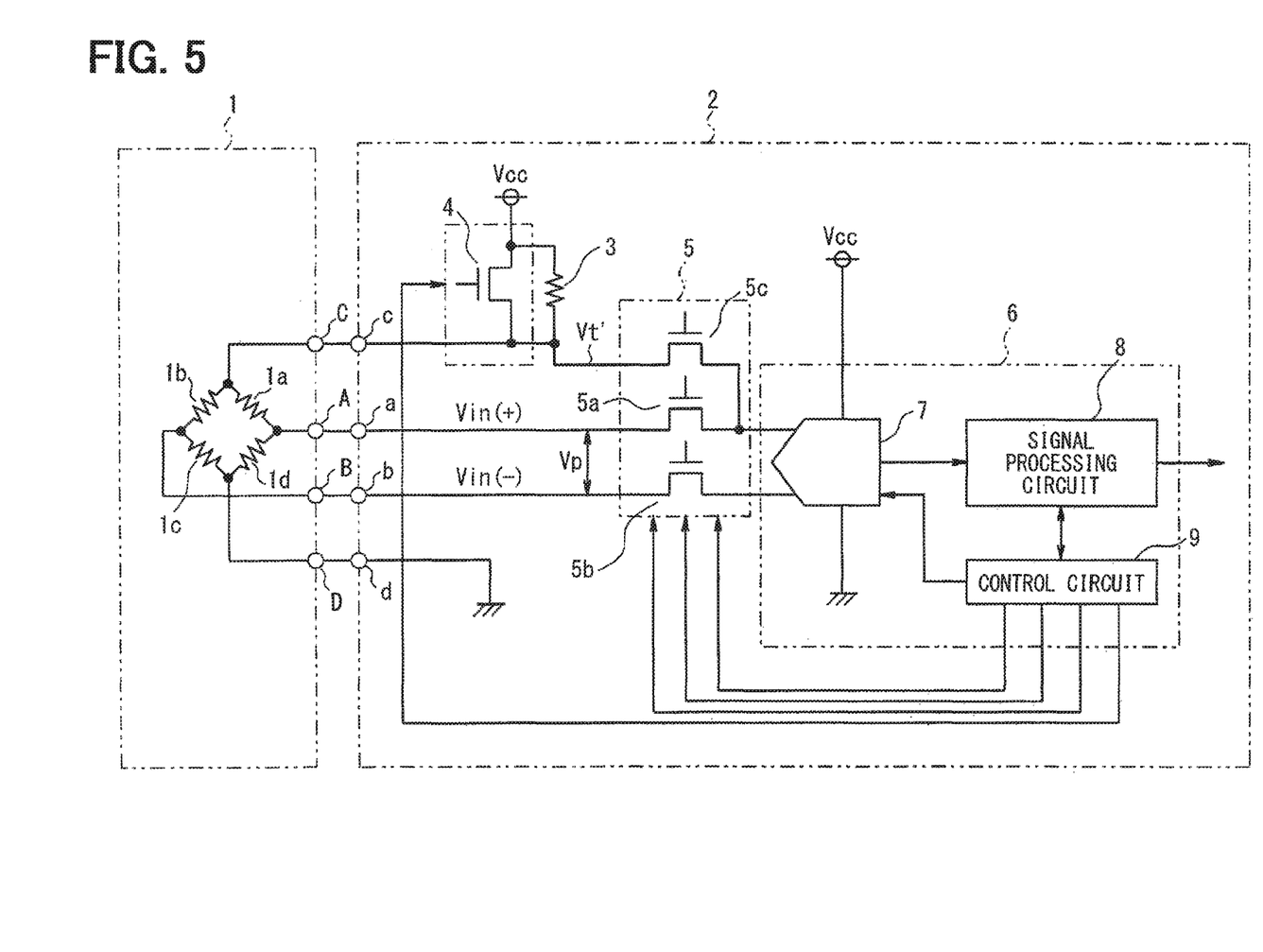
FIG. 5 is an electric configuration diagram illustrating a second embodiment of the present disclosure.

FIG. 5 illustrates a second embodiment which is different from the first embodiment with respect to the connection position of the temperature detection resistor 3 and the FET 4. As illustrated in FIG. 5, the temperature detection resistor 3 and the FE 4 are connected between the constant voltage power supply Vcc and the terminal "c". In this case, a temperature detection signal Vt' detects a voltage applied to the pressure sensor element 1. Therefore, the temperature detection signal Vt can be obtained by the following equation (10).

$$Vt = Vcc - Vt' [V] \quad (10)$$

Except for the above point, the detecting operation is almost the same as that of the first embodiment. Therefore, also by the second embodiment, an operation effect similar to that of the first embodiment can be obtained.

Third Embodiment

Figure 6:
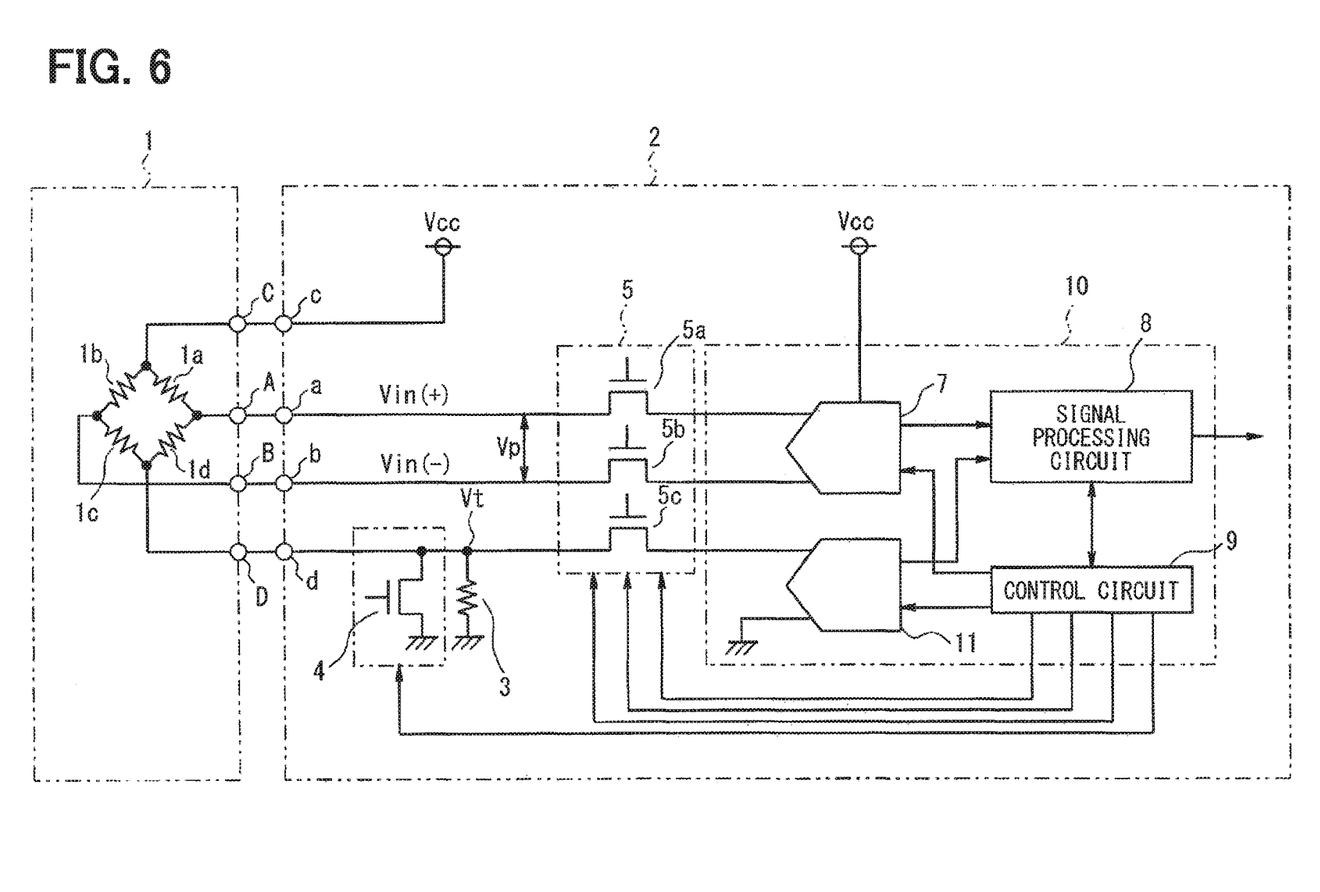
FIG. 6 is an electric configuration diagram illustrating a third embodiment of the present disclosure.

FIG. 6 illustrates a third embodiment which is different from the first embodiment with respect to the configuration of a control unit 10 obtained by adding a cyclic A/D conversion circuit 11 in addition to the cyclic A/D conversion circuit 7. In the configuration, as illustrated in FIG. 6, the cyclic A/D conversion circuits 7 and 11 receive the pressure detection signal Vp and the temperature detection signal Vt, respectively.

Also by the third embodiment, an operation effect similar to that of the first embodiment can be obtained. In the third embodiment, the burden on the A/D converting process is lessened as compared with that in the configuration of the first embodiment, so that higher detection frequency can be set.

Fourth Embodiment

Figure 7:
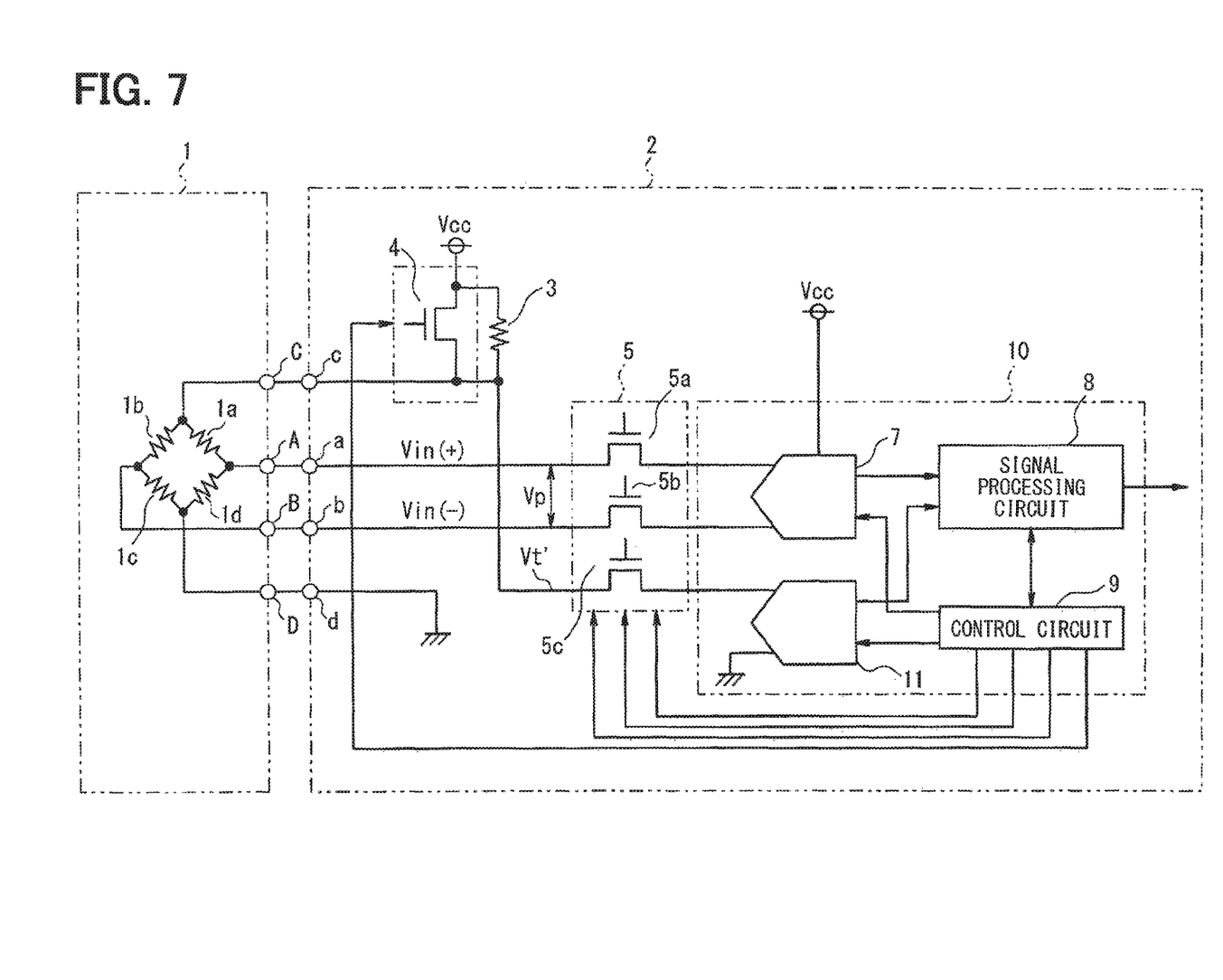
FIG. 7 is an electric configuration diagram illustrating a fourth embodiment of the present disclosure.

FIG. 7 illustrates a fourth embodiment which is different from the third embodiment with respect to the connection position of the temperature detection resistor 3 and the FET 4. As illustrated in FIG. 7, the temperature detection resistor 3 and the FET 4 are connected between the constant voltage power supply Vcc and the terminal "c". In this case, the temperature detection signal Vt' detects a voltage applied to the pressure sensor element 1. Therefore, the temperature detection signal Vt can be obtained as expressed by the above-described equation (10).

Therefore, an operation effect almost similar to that of the third embodiment can be obtained.

Fifth Embodiment

Figure 8:
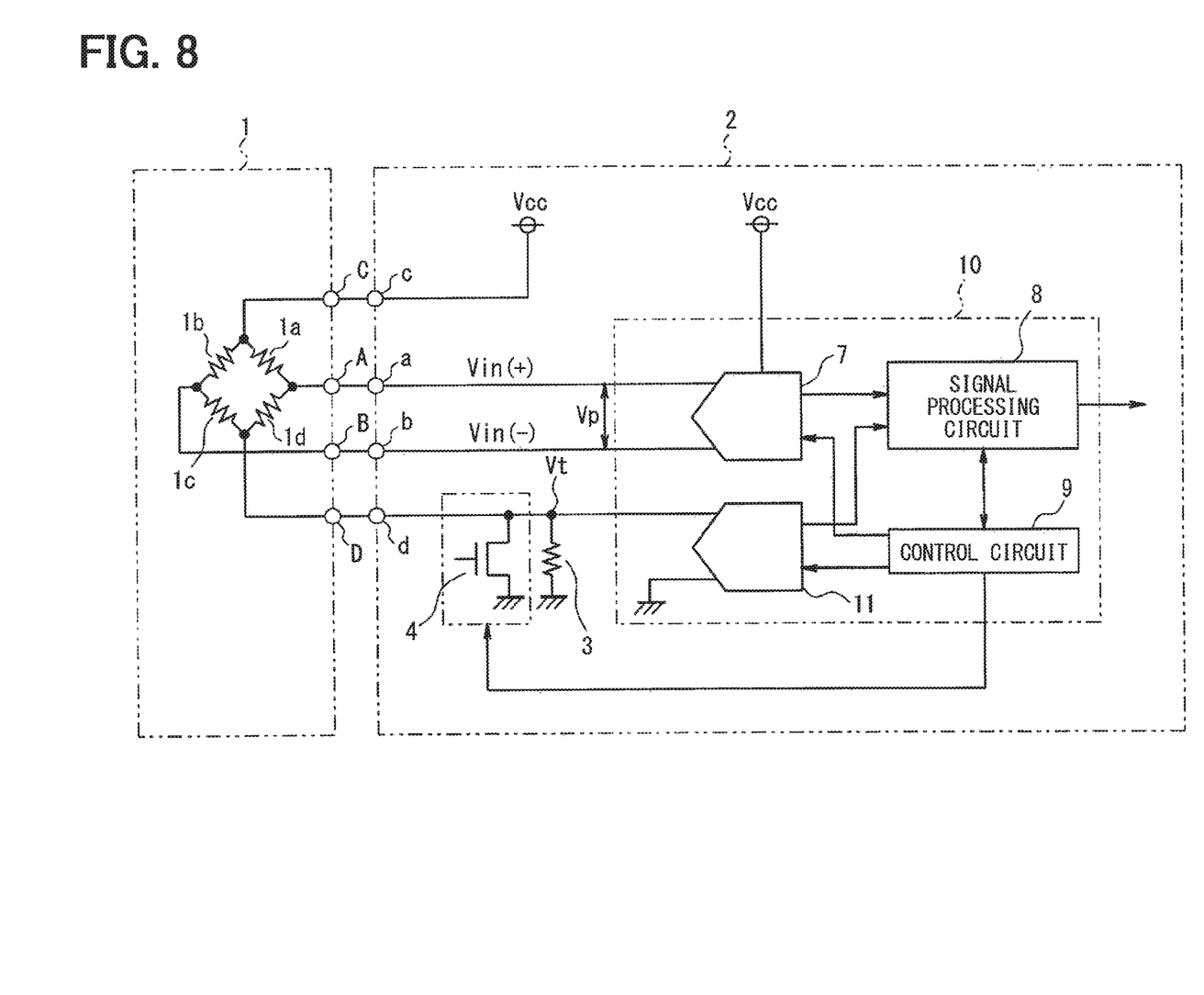
FIG. 8 is an electric configuration diagram illustrating a fifth embodiment of the present disclosure.

FIG. 8 illustrates a fifth embodiment which is different from the third embodiment with respect to the configuration that the time division changing switch 5 is not provided. Since the cyclic A/D conversion circuits 7 and 11 are provided as circuits for A/D converting the pressure detection signal Vp and the temperature detection signal Vt, respectively, the signals are input as they are without providing the FEN 5a to 5c and performing the switching control. In this case, in the cyclic A/D conversion circuits 7 and 11, the signals are fetched at predetermined timings and A/D converted under the control of the control circuit 9.

Therefore, the fifth embodiment can also obtain an operation effect almost the same as that of the third embodiment. Also in the embodiment, in a manner similar to the second or fourth embodiment, the configuration of connecting the temperature detection resistor 3 and the FET 4 to the constant voltage power supply Vcc side can be employed.

OTHER EMBODIMENTS

The present disclosure is not limited only to the above-described embodiments but can be applied to various embodiments without departing from the gist and, for example, can be modified or expanded as follows.

Although the configuration of using the FET 4 and FETs 5a to 5c as the semiconductor switching elements has been employed, the disclosure is not limited to the configuration. Semiconductor elements such as bipolar transistors or IGBT (Insulated Gate Bipolar Transistors) may be used as semiconductor switching elements.

The details of the control illustrated in FIG. 2 executed by the control circuit are described to be executed in a software manner. Instead, they can be executed by a hard circuit or a configuration in which software and hardware is combined.

The process of temperature correction based on the temperature detection signal Vt can be variously applied in such a manner that correction can be made by the temperature detection signal Vt of once, an average of the temperature detection signals Vt of a plurality of times can be calculated and used, or the temperature detection signal Vt when a predetermined or more change occurs is employed and the correcting process is performed. In consideration of the influence of the change in temperature on the detection precision, the detection frequency or the way of using the detection signal can be selected. In such a manner, the control in which improvement in detection precision and reduction of process burden are considered can be performed.

Although the example of using the pressure sensor element 1 as the sensor element has been described, the disclosure is not limited to the example but can be applied to various sensor elements in which fluctuation in a detection signal according to temperature is supposed.

Although the example of providing the temperature detection resistor 3 on the ground terminal side and the example of providing the temperature detection resistor 3 on the constant voltage power supply terminal side have been described, a configuration of providing the temperature detection resistor 3 on both of the ground terminal side and the constant voltage power supply terminal side can be also employed.

In the foregoing embodiments, the example of the case of performing temperature correction on the detected pressure detection signal Vp and outputting the corrected signal as temperature information in a real-time manner has been described. The disclosure is not limited to the example. Data obtained by digital-converting the pressure detection signal and the temperature detection signal may be stored together with time and, after measurement, the process of temperature correction can be performed on the data in a lump.

Although the temperature detection signal Vt has been described as an example of information used for temperature correction on the pressure detection signal Vp in each of the embodiments, the disclosure is not limited to the example. Temperature information can be also output to the outside. Consequently, transition of the temperature fluctuation in the measurement environment can be also monitored. The obtained temperature information can be stored on the inside.

Although an example of constructing the detection circuit 2 by a single-chip semiconductor element has been described, the detection circuit 2 may be also constructed by combining a plurality of semiconductor elements.

Although the circuit using the cyclic A/D conversion circuit 7 has been described as the circuit of digital-converting the pressure detection signal Vp and the temperature detection signal Vt in each of the embodiments, the disclosure is not limited to the configuration. The circuit can be also configured by combination of a normal A/D conversion circuit and an amplification circuit.

The invention claimed is:

1. A sensor signal detection device comprising:
   a sensor element;
   a temperature detection element that is connected in series with the sensor element;
   a constant voltage power supply that applies a constant voltage to a series circuit of the sensor element and the temperature detection element;
   a short-circuit switch that short-circuits both terminals of the temperature detection element; and
   a controller that controls a changeover, in a time division manner, between a sensor detection state in which a sensor signal of the sensor element is obtained by turning on the short-circuit switch so as to apply the constant voltage across both terminals of the sensor element from the constant voltage power supply and a temperature detection state in which a temperature detection signal of the temperature detection element is obtained by turning off the short-circuit switch so as to connect the temperature detection element to the sensor element in series and to apply the constant voltage to the series circuit from the constant voltage power supply.

2. The sensor signal detection device according to claim 1,
   wherein the sensor element includes a pressure sensor configured by bridge-connecting resistors.

3. The sensor signal detection device according to claim 1,
   wherein the temperature detection element includes a resistive element for temperature detection.

4. The sensor signal detection device according to claim 1, further comprising:
   a changeover switch that performs switching so as to output the sensor signal to the controller in the sensor detection state and to output the temperature detection signal to the controller in the temperature detection state.

5. The sensor signal detection device according to claim 1,
wherein the controller has a temperature compensation processor that performs a temperature compensating process on the sensor signal obtained from the sensor element based on the temperature detection signal.

6. The sensor signal detection device according to claim 1,
wherein the controller controls the changeover between the sensor detection state and the temperature detection state at predetermined time intervals alternatively.

7. The sensor signal detection device according to claim 1,
wherein the controller controls the changeover from the sensor detection state to the temperature detection state when the sensor detection state is set a plurality of times at a predetermined time interval.

8. The sensor signal detection device according to claim 6,
wherein the temperature detection signal is obtained when the sensor detection state is switched to the temperature detection state each time or at every plurality of times.

9. A sensor signal detection device in a signal processing device of a sensor element according to claim 1,
wherein the controller has an analog-digital conversion circuit that amplifies the sensor signal and the temperature detection signal obtained respectively from the sensor element and the temperature detection element and converts the sensor signal and the temperature detection signal to digital signals.

10. The sensor signal detection device according to claim 1,
wherein the short-circuit switch is a semiconductor switching element which is turned on or off through the controller.

11. The sensor signal detection device according to claim 4,
wherein the changeover switch is a semiconductor switching element which is turned on or off through the controller.

* * * * *